(12) United States Patent
Fisher et al.

(10) Patent No.: US 7,107,121 B2
(45) Date of Patent: Sep. 12, 2006

(54) AUTONOMIC FIDUCIAL SEARCH PATTERN IN AN AUTOMATED TAPE LIBRARY

(75) Inventors: James Arthur Fisher, Tucson, AZ (US); Nicholas James Pakidis, Matawan, NJ (US); Kerri Renee Shotwell, Tucson, AZ (US)

(73) Assignee: International Business Machines Corp., Armonk, NY (US)

( * ) Notice: Subject to any disclaimer, the term of this patent is extended or adjusted under 35 U.S.C. 154(b) by 574 days.

(21) Appl. No.: 10/652,439

(22) Filed: Aug. 29, 2003

(65) Prior Publication Data

US 2005/0046990 A1 Mar. 3, 2005

(51) Int. Cl.
*G06F 7/00* (2006.01)
(52) U.S. Cl. ............ 700/229; 700/214; 700/213; 382/151; 382/287
(58) Field of Classification Search ............ 700/213, 700/214, 225, 229; 382/151, 287
See application file for complete search history.

(56) References Cited

U.S. PATENT DOCUMENTS

| 5,872,751 | A | 2/1999 | Utsumi |
| 5,946,160 | A | 8/1999 | Ohashi |
| 6,115,648 | A | 9/2000 | Gallo |
| 6,473,706 | B1 | 10/2002 | Gallo |
| 6,798,925 | B1* | 9/2004 | Wagman ............... 382/287 |
| 6,980,692 | B1* | 12/2005 | Chamberlain ......... 382/170 |
| 2003/0053715 | A1 | 3/2003 | Chamberlain |

* cited by examiner

*Primary Examiner*—Khoi H. Tran
(74) *Attorney, Agent, or Firm*—Law Office of Charles W. Peterson, Jr.; Dale M. Crockatt

(57) ABSTRACT

A storage system or subsystem, method of locating components in the storage system and program product therefor. Storage system components have fiducial marks identifying component location. A sensor is located at an expected fiducial location and a first pass search for the fiducial is conducted along a search path. A second pass search, if needed, begins at a position located, horizontally, between the first pass start position and the system accessor home location.

21 Claims, 4 Drawing Sheets

AUTONOMIC FIDUCIAL SEARCH PATTERN IN AN AUTOMATED TAPE LIBRARY

BACKGROUND OF THE INVENTION

1. Field of the Invention

The present invention is related to a mass storage device and more particularly to a mass storage device with removable storage media and methods of locating components within the mass storage device.

2. Background Description

Data storage systems administering data stored on removable storage media, such as an automated storage media (e.g., tape cartridges) and retrieval library for storing and accessing removable storage media, are well known in the art. In a typical prior art such data storage system, an automated tape library accessor or robot accessor is calibrated to locate elements such as storage cells and drive feed slots within the physical space of the system. For example, a light source/receiver or teach sensor at the accessor senses reflections from a fixed reflective fiducial mark. Tape storage cells are located at known positions relative to the fiducial mark or to a specific reference on the fiducial mark, e.g., a corner or an edge. So, by finding certain edges of the fiducial mark, precise coordinates of the associated cells can be calculated and used for later access.

Initially, the accessor locates the fiducial by moving the teach sensor to an expected fiducial location, which is where the accessor should find the fiducial. In actual practice, however, and especially with the passage of time since the most recent alignment, the accessor seldom finds the fiducial mark at the expected location. Consequently, the accessor usually conducts a search, following a selected search pattern, often in two passes, to locate the fiducial mark. Once the accessor locates the fiducial, the accessor can align to the reference edges. In some instances as the system ages, misalignment may cause the accessor to overshoot the fiducial mark by margins that increase with age. When this occurs, the accessor may be unable to locate the correct fiducial, instead finding another fiducial mark or mistaking a tape cartridge label for the fiducial mark.

Thus, there is a need to insure that an automated tape library accessor find all fiducial marks with certainty within a tape library system.

SUMMARY OF THE INVENTION

It is a purpose of the invention to accurately locate components in a data storage subsystem;

It is another purpose of the invention to quickly locate fiducials in a data storage subsystem;

It is yet another purpose of the invention to reliably locate fiducials in a data storage subsystem;

It is yet another purpose of the invention to avoid identifying a wrong fiducial and/or mistakenly aligning to a tape label in a data storage subsystem, when alignment with a fiducial was intended.

The present invention relates to a storage system or subsystem, method of locating components in the storage system and program product therefor. Storage system components have fiducial marks identifying component location. A sensor is located at an expected fiducial location and a first pass search for the fiducial is conducted along a search path. A second pass search, if needed, begins at a position located, horizontally, between the first pass start position and the system accessor home location.

BRIEF DESCRIPTION OF THE DRAWINGS

The foregoing and other objects, aspects and advantages will be better understood from the following detailed description of a preferred embodiment of the invention with reference to the drawings, which.

DESCRIPTION OF PREFERRED EMBODIMENTS

Figure 1:
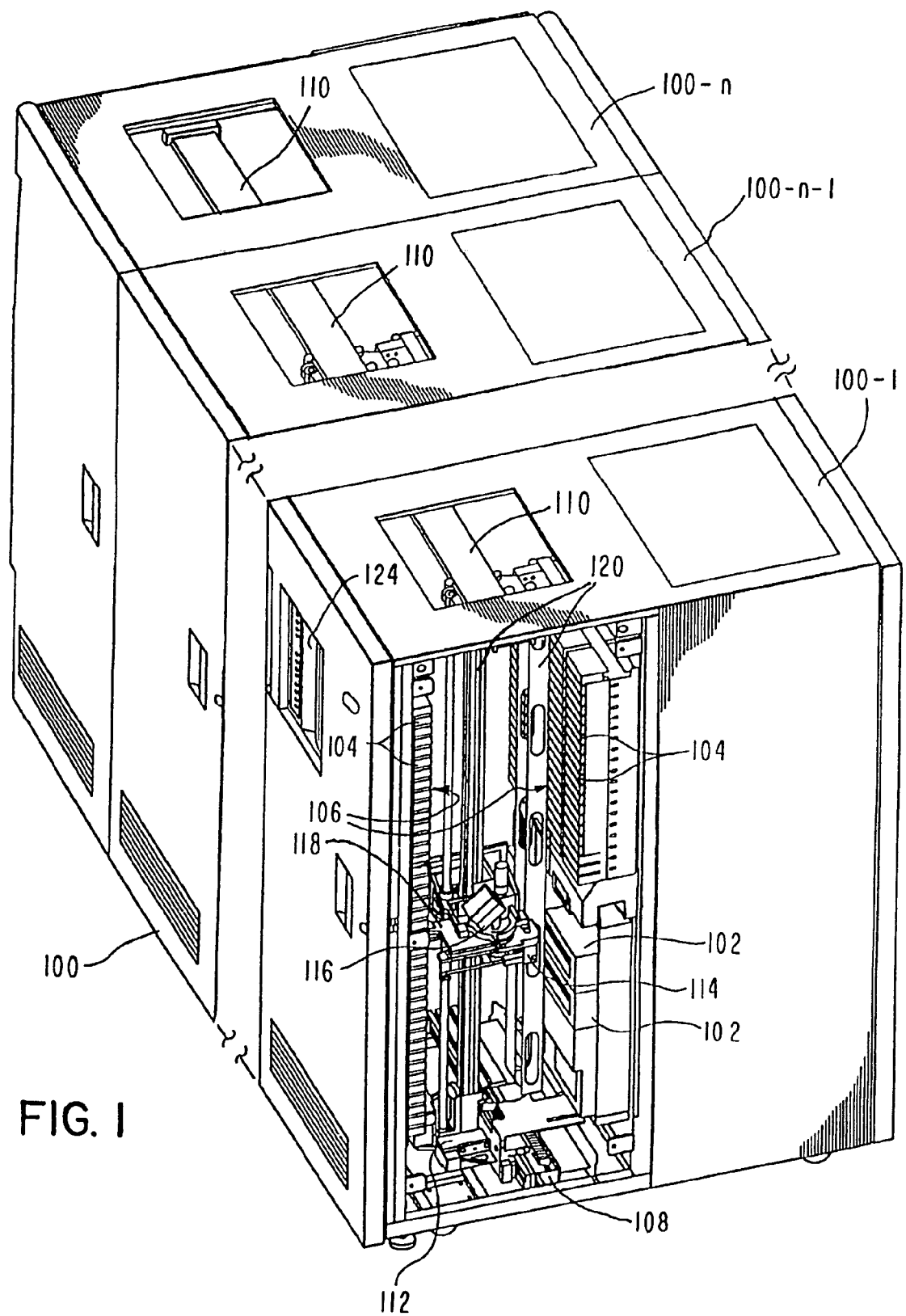
FIG. 1 shows an example of a preferred data storage subsystem, wherein storage subsystem components are located with respect to a fiducial mark according to a preferred embodiment of the present invention.

FIG. 1 shows an example of a multi-frame preferred data storage subsystem 100, such as an automated storage media (e.g., tape cartridges) and retrieval library for storing and accessing storage media located within the subsystem 100 relative to fiducial marks in the subsystem. The likelihood of identifying the correct location for each fiducial is increased, thereby reliably locating subsystem components within the subsystem. Although for simplicity of description, application of the present invention is described with reference to a tape cartridge storage subsystem 100, e.g., an IBM 3494 Tape Library Dataserver (IBM 3494), this is for example only. Thus, the present invention has application to any suitable storage subsystem with removable storage media. Further, storage media may be magnetic storage media such as magnetic tape, magnetic disk, optical storage such as compact disk (CD) or digital versatile disk (DVD), or any suitable equivalent non-volatile or volatile storage media.

In this example the data storage subsystem 100 includes a number (n) of frames 100-1, . . . , n-1 and n, where n is an integer and is subsystem dependent, e.g., 16. Each frame 100-1, . . . , n-1, n may include one or more drive units 102 for reading and/or writing data on the physical volumes 104. As noted hereinabove and depending upon the particular storage media, the drives 102 can be optical disk drives or magnetic disk or tape drives. Correspondingly, the physical volumes 104 can be cartridges or cassettes containing optical or magnetic media (e.g., magnetic tape) or any other suitable removable media and associated drives. Typically, a single physical volume 104 can be individually addressed and accessed by a volume serial number. Within a frame 100-1, . . . , n-1, n physical volumes or media cartridges 104 may be stored in storage cells in a storage rack 106. A lower rail 108 in each frame 100-1, . . . , n-1, n, typically, a plastic toothed rail (rack and pinion), extends the length of the respective frame 100-1, . . . , n-1, n and attaches to adjacent frame lower rails 108 to form a single lower horizontal rail. An upper rail 110 is disposed immediately above and opposing each lower rail 108.

The subsystem 100 includes at least one automated system actuator assembly that includes an accessor 112 and gripper 114, slidably mounted on horizontal upper and lower rails 110, 108, respectively. The accessor 112, shown at its home location in this example, transports a selected physical volume 104 between a storage cell in storage racks 106 and a drive 102. The cartridge gripper 114 grips and holds the selected physical volume 104 during transport. A bar code scanner 116, or similar visual input unit, is mounted on the gripper 114 to "read" labels identifying cartridges with a corresponding volume serial number. A teach sensor 118 is located on the gripper 114 with the bar code scanner 116. Lower rails 108, typically plastic toothed rails (in a rack and pinion drive assembly), position the accessor 112 horizontally with respect to the storage rack 106. Lower rails 108 can be positioned adjacent to lower rails 108 of other frames to form a single horizontal toothed rail for accessor travel. Vertical rail (a barber pole shaft (not shown)) and guide 120 position the gripper 114 vertically with respect to the storage rack 106. Typically, the accessor 104 uses the teach sensor 114 to locate a fiducial mark (described hereinbelow) and the location of each subsystem component or feature (each drive 102 or physical volumes 104 in shelves in storage racks 106 this example) can be determined from the fiducial mark location. An input/output (I/O) station 124 may be included for manual (operator) input and output of removable media.

The teach sensor 118 may be a directional sensor, e.g., a low power laser or LED, which may be moved precisely to make exacting calibration measurements. For example, the accessor 112 may move the teach sensor 118 to locate a fiducial or, alternately, the accessor 112 may move for coarse measurements and the calibration sensor or teach sensor beam may be deflected for fine measurement. Typically, the teach sensor 118 travels the length of the library between frames 100-1, . . . , n-1, n along the toothed lower rail 108. By construction the lower (plastic) rails 108 are aligned using an alignment tool to ensure proper spacing between rail segment teeth. This tooth spacing is subsystem dependent and the teeth spacing determines distance traveled.

However, rail segments (lower rail 108 in each frame 100-1, . . . , n-1, n) may lengthen over time and under some conditions (e.g., temperature/humidity) can increase in length by 1 mm or more (e.g., in a 16 frame library (16 rail segments) observed rail growth has been as much as 19 mm). This length change may cause binding at transition points where adjacent rail segments join between adjacent frames. To alleviate this binding, the proper tooth spacing can be reset using an alignment tool. However, resetting the tooth spacing increases the total rail segment length. As a consequence, the accessor may miss the correct fiducial and align to the wrong fiducial or, mistakenly, to a tape cartridge label.

Figure 2:
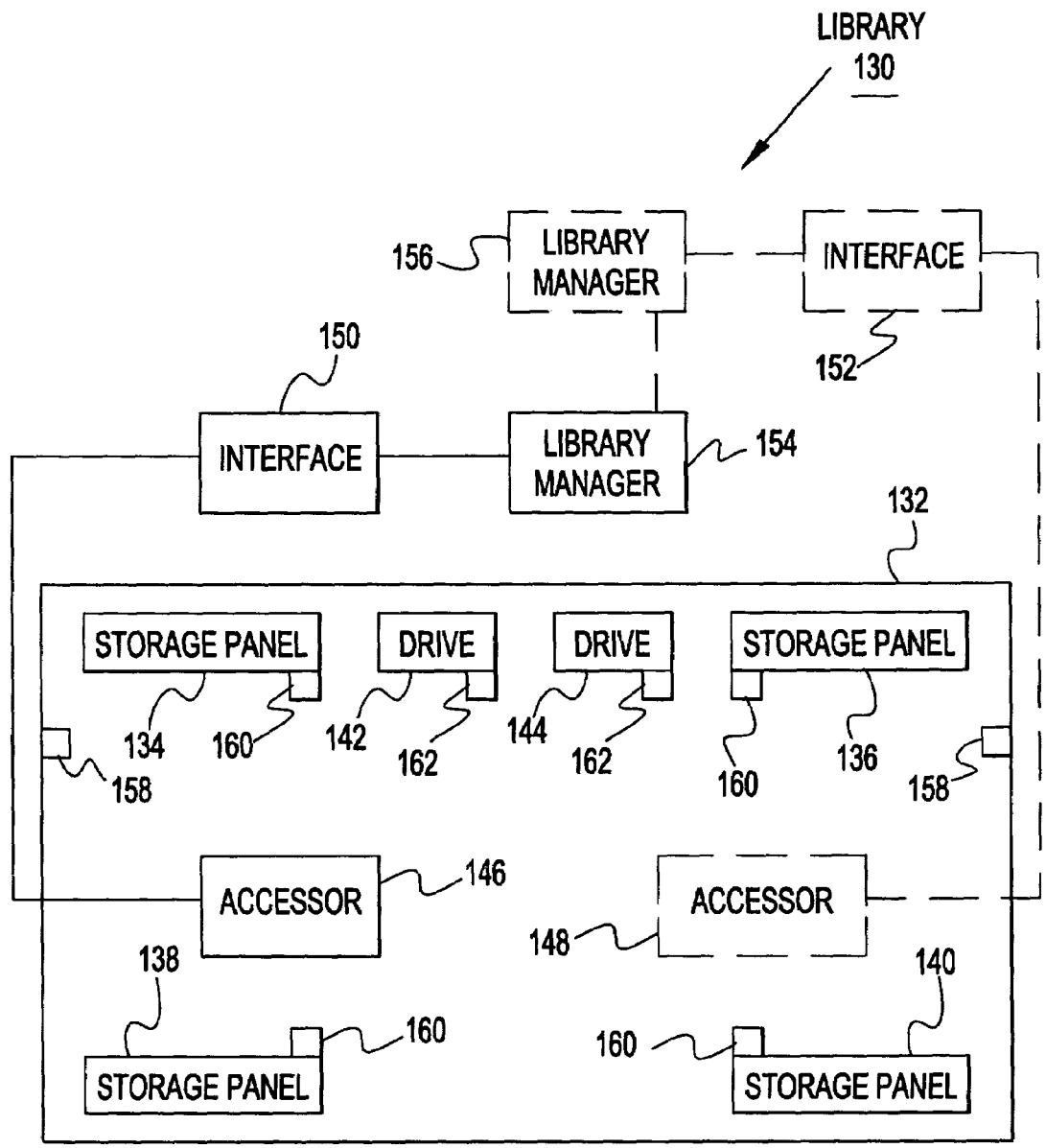
FIG. 2 shows a plan view of an exemplary data storage library including a data storage subsystem.

FIG. 2 shows a plan view of an exemplary data storage library 130 including a data storage subsystem 132 such as data storage subsystem 100 in the example of FIG. 1. In this example, the data storage subsystem 132 includes at least four (4) storage panels or storage racks 134, 136, 138, 140, (e.g., substantially similar to storage racks 106 and distributed in frames 100-1, . . . , n-1, n) and tape drives 142, 144 (e.g., substantially similar to tape drives 102 and which also may be distributed in frames 100-1, . . . , n-1, n). Also, the data storage subsystem 132 includes at least one accessor 146 and may include more, e.g., 148, each having a home location at opposite ends of lower rails 108. Each accessor 146, 148 interfaces through an interface 150, 152 to a corresponding library manger 154, 156. Fixed alignment marks or fiducials 158 are provided at fixed locations in the data storage subsystem 132. A rack fiducial 160 is provided at bulk storage racks 134, 136, 138, 140. Finally, a drive fiducial 162 is provided at each of the tape drives 142, 144. It should be noted that the fiducials 158, 160, 162 are represented as a single rectangle for example only and may multiple shapes distributed at selected locations about the particular component or feature, e.g., storage panel 134, 136, 138, 140 or drive 142, 144.

U.S. Pat. No. 6,115,648 entitled "System and Method for Non-invasive Accessor Recalibration" to Frank D. Gallo (Gallo) and U.S. Pat. No. 6,473,706 B1 to Gallo et al. entitled "Self-configuring and Self-calibrating Automated System" to Gallo et al. (Gallo et al.), both assigned to the assignee of the present invention and incorporated herein by reference describe typical state of the art alignment techniques. As described in Gallo, nominal (manufacturer) fiducial and system component (drives and storage cells) location coordinates are maintained in a resource file. A system file contains current master coordinates for fiduicals from the most recent subsystem master alignment. A database file contains the most recent calculated system component locations with offsets from the most recent alignment. The fiducial master coordinates are updated during a teach operation and the new measured positions are stored in the system file. Occasionally, rail growth (of the lower rails 108) may cause inaccurate fiducial measurements.

Figure 3A:
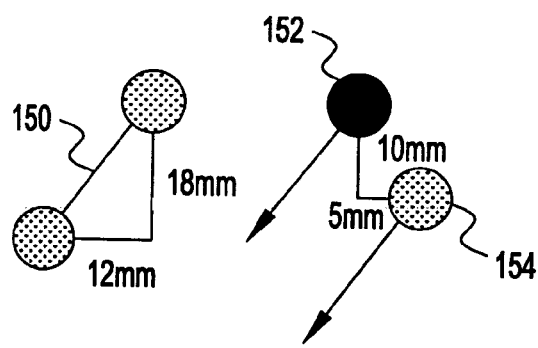
FIGS. 3A–D show a graphic comparison of prior alignment in two passes with two pass alignment by a preferred data storage subsystem.
Figure 3B:
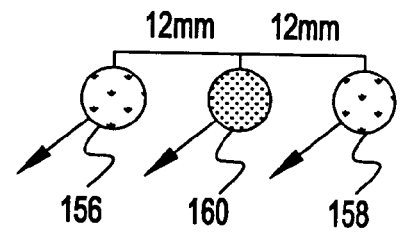
Figure 3C:
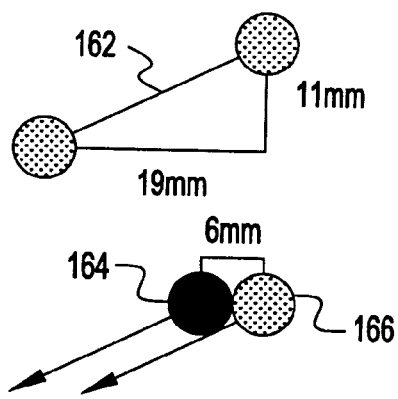
Figure 3D:
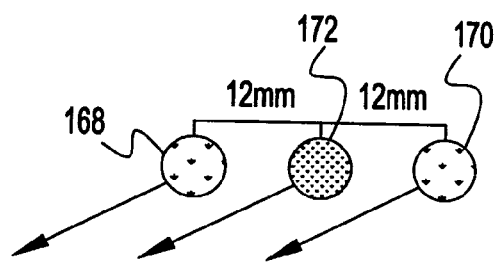

FIGS. 3A–D show a graphic comparison of prior alignment in two passes with two pass alignment by a preferred data storage subsystem according to the present invention. In the presently described embodiment, a second pass is necessary only when the fiducial is not found in the first pass. Dimensions and units are for example only for a state of the art data storage subsystem such as an IBM 3494 and not intended as a limitation. As can be seen for a find I/O (FIO) find rack (FRK) scan in FIG. 3A (representing path beginning and end points as circles and direction of travel by an arrow), typical prior art IBM 3494 scan path 150 was 18 mm down (vertically) and 12 mm left (horizontally) with the second pass start location 152 being 5 mm left and 10 mm up, referenced from the first pass starting point 154. By contrast, as shown in FIG. 3B the preferred data storage subsystem positions the second pass starting point 156, 158 twelve millimeters (12 mm) from the corresponding first pass starting point, 160 and in the direction of accessor home, respectively, and proceeds to scan 12 mm left and 12 mm down for the fiducial. Similarly, for a drive alignment (FAC) scan in FIG. 3C the prior art scan path 162 was 11 mm down and 19 mm left with the second pass starting point 164 left 6 mm of the first pass starting point 166. Again, as shown in FIG. 3D the preferred second pass scan starting point 168, 170 is towards accessor home, by 12 mm in this example, from the first pass starting point 172. Once the fiducial is located, the location is returned to the library manager, stored in the resource file and subsystem alignment proceeds normally. Thus, instead of moving farther and farther from accessor home, the starting point 156, 158, 168, 170 for the second scan pass is 12 mm closer to accessor home than the first pass staring point 160, 172, insuring that all fiducial marks can be found regardless of rail growth.

Horizontal fiducials are provided with drives (102 in FIG. 1) and the rectangular fiducial marks are oriented such that the long side is horizontal. The theoretical search start location (i.e., the location of the upper right corner stored in the system file) and search pattern, left (e.g., 19 mm) and down (e.g., 11 mm) need not be changed. If the positioning is ideal or unchanged from the previous subsystem master alignment, the fiducial will be found early in the first search pass using, for example, a normal horizontal fiducial search pattern. However, the start position of any necessary second search is always closer to the accessor's home instead, i.e., by 12 mm in the above examples, thus expanding the search pattern and compensating for any rail growth. By contrast with prior art methods the second pass (which previously was always 6 mm to the left) started farther from the accessor's home half the time, i.e., the wrong direction when there is rail growth.

Vertical fiducials (again rectangles) are provided for the Convenience I/O station and storage racks (e.g., 124 and 106 in FIG. 1, respectively) and the rectangular fiducial marks are oriented such that the long side is vertical. The theoretical search start location (the fiducial right side midpoint) and search pattern, down (e.g., 18 mm) and left (e.g., 12 mm) need not be changed. Typically, only the bottom half of the fiducial is in the search path. Again if the positioning is ideal or unchanged from the previous subsystem master alignment, the fiducial will be found early in the first search pass using, for example, a normal first pass vertical fiducial search pattern. Otherwise, when the fiducial is not found in the first pass search, a prior second pass search shifted the prior art second pass starting point to the left (5 mm) and up (10 mm). However, as noted above rail growth may have caused the fiducial to be too far to the right to be found in the first pass. So, because of rail growth, the accessor may fail to locate the fiducial in a prior art second pass search. Instead, the accessor may search past the fiducial and find another fiducial. By contrast a preferred search pattern takes advantage of the vertical fiducial height in combination with more precise Y axis (vertical) movement by the accessor, which is less susceptible to rail growth errors. Thus, the accessor searches equally horizontally (e.g. 12 mm to the left) with the same (12 mm) vertical movement. To further avoid finding the wrong fiducial, the preferred second start position is moved horizontally (e.g., 12 mm) towards the accessor's home. Thus, by locating the second pass starting point towards accessor home in the direction of least rail growth sensitivity, the correct fiducial is found consistently, avoiding inadvertently identifying a cartridge label as a fiducial.

Figure 4A:
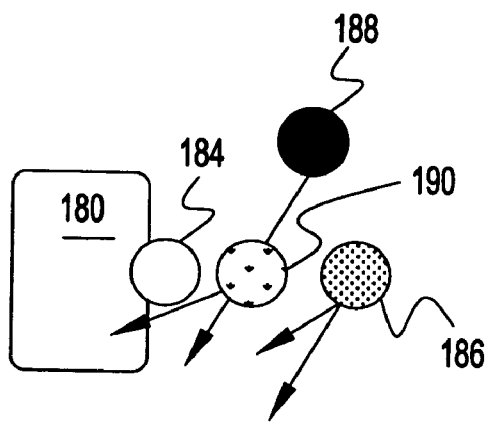
FIGS. 4A–B show an example of the effects of rail growth on alignment for locating vertical fiducials at opposite ends of a multi frame subsystem with all growth away from accessor home.
Figure 4B:
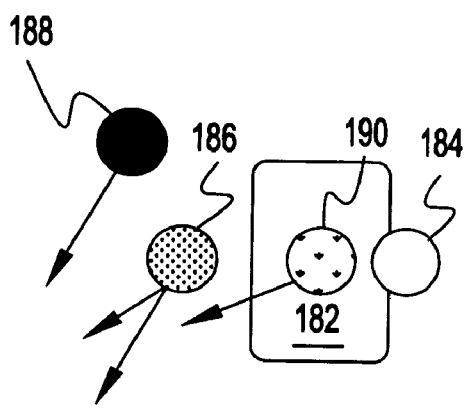

FIGS. 4A–B show an example of the effects of rail growth on alignment for locating a vertical fiducial 180, 182, e.g., at storage racks at opposite ends of a multi frame (e.g., 16) subsystem 100 of FIG. 1 with all rail growth at the particular fiducial 180, 182 away from accessor home. Thus, the initial theoretical start is at position 184 but, because of rail growth, the first pass search (represented by the arrow extending from the start position 186) starts at location 186, which is 19 mm from the fiducial 180, 182. The fiducial 180, 182 is not encountered in the subsequent fist pass search. A prior art second pass starts at position 188 and the search (represented by the arrow extending from start position 188) still misses fiducial 180, 182 and ends even farther away from fiducial 182. Advantageously, however, a second pass start position 190 located according to the present invention begins the search (represented by the arrow extending from start position 190) in the direction of the theoretical start position 184 and is even located in fiducial 182. In both examples, the prior art search misses the fiducial, where the preferred search finds it.

Figure 5A:
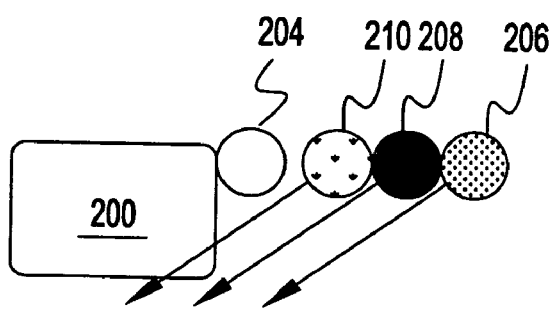
FIGS. 5A–B show an example of the effects of rail growth on alignment for locating horizontal fiducials at opposite ends of a multi frame subsystem with all growth away from accessor home.
Figure 5B:
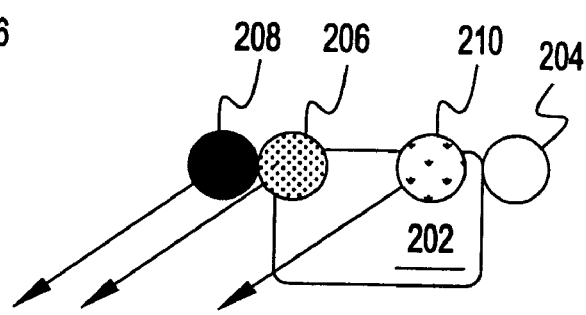

Similarly, FIGS. 5A–B show an example of the effects of rail growth on alignment for locating a horizontal fiducial 200, 202, e.g., at drives also located at opposite ends of a multi frame (e.g., 16) subsystem 100 of FIG. 1 with all growth away from accessor home. Thus, the initial theoretical start is at position 204 but, because of rail growth, the first pass the search starts at location 206, again 19 mm from the fiducial 200, 202. The fiducial 200, 202 is not encountered in the subsequent first pass search. A prior art second pass search starts at position 208 and the subsequent second pass search misses the fiducials 200, 202 and, again, ends even farther away from fiducial 202. Similarly, a preferred second pass start position 210 located according to the present invention advantageously begins the search in the direction of the theoretical start position 204 and is even located in fiducial 202. Thus, for both the vertical fiducials 180, 182 of FIGS. 4A–B and the horizontal fiducials 200, 202 of FIGS. 5A–B, searching according to the present invention locates fiducials 180, 182, 200, 202 in spite of rail growth that would have otherwise located wrong or false fiducials.

Advantageously, by always moving the accessor towards home for a second pass search, the fiducial search pattern accommodates possible rail growth. The likelihood of successfully finding the correct fiducials is increased regardless of rail growth or lack thereof. Thus, searching for fiducials according to the present invention prevents inadvertently aligning to the wrong fiducial, especially when 2 fiducials are vertically near each other or, even mistakenly aligning to a cartridge label.

While the invention has been described in terms of preferred embodiments, those skilled in the art will recognize that the invention can be practiced with modification within the spirit and scope of the appended claims.

What is claimed is:

1. A method of locating components in a storage device, said method comprising the steps of:
   a) positioning a sensor at an expected fiducial location;
   b) searching for a fiducial along a first pass search path by moving said sensor along said first pass search path and checking for said fiducial;
   c) positioning said sensor at a second pass start location, said second pass start location being between said expected fiducial location an accessor home location;
   d) searching for said fiducial along a second pass search path by moving said sensor along said second pass search path and checking for said fiducial; and
   e) returning a current location for said fiducial.

2. A method of locating components in a storage device as in claim 1, wherein if said fiducial is found in the searching step (b), searching step (b) further comprises continuing to step (e) and returning said current location.

3. A method of locating components in a storage device as in claim 1, wherein the positioning step (a) comprises positioning said accessor at a home location.

4. A method of locating components in a storage device as in claim 1, wherein said second pass start location is located directly horizontal to said expected fiducial location, horizontal being a direction of accessor travel between storage device frames.

5. A method of locating components in a storage device as in claim 4, wherein said fiducial is rectangular and said second pass start location is located at least the rectangular said fiducial width from said expected fiducial location.

6. A method of locating components in a storage device as in claim 4, wherein said second pass start location is 12 mm on the horizontal from said expected fiducial location.

7. A method of locating components in a storage device as in claim 1, wherein said first pass search path and said second pass search path are parallel search paths down and left and said second pass start location is to the right of said expected fiducial location.

8. A method of locating components in a storage device as in claim 1, whereby said fiducial is found and a correct location is returned as said current location in said returning step (e).

9. A computer program product for locating components in a storage device, said computer program product comprising a computer usable medium having computer readable program code thereon, said computer readable program code comprising:
   computer readable program code means for maintaining expected fiducial locations;
   computer readable program code means for positioning a sensor at a fiducial search location;
   computer readable program code means for directing said sensor along a search path and checking for said fiducial;
   computer readable program code means for determining a second pass start location, said second pass start location being located between an expected fiducial location an accessor home location; and
   computer readable program code means for returning a current location for said fiducial, whereby said fiducial is found and a correct location is returned as said current location.

10. A computer program product for locating components in a storage device as in claim 9, wherein said sensor is positioned at said expected fiducial location for a first pass search and said second pass start location for a second pass search.

11. A computer program product for locating components in a storage device as in claim 9, wherein said search path has vertical and horizontal components and said computer readable program code means for determining said second pass start location locates said second pass start location directly horizontal from said expected fiducial location.

12. A computer program product for locating components in a storage device as in claim 11, wherein said expected fiducial locations comprise a corner location for a first group of fiducials and a side midpoint location for a second group of fiducials, said fiducial being rectangular, said first group having longer sides oriented horizontally and said second group having said longer sides oriented vertically.

13. A computer program product for locating components in a storage device as in claim 9, further comprising:
   computer readable program code means for positioning said accessor at a home location.

14. A storage system for storing and administering data in a data library, said storage system comprising:
   a plurality of storage frames, each of said storage frames including storage racks storing removable storage media;
   a toothed rail in each of said plurality of storage frames, each said toothed rail joined with adjacent toothed rails in adjacent said storage frames and forming a horizontal rail;
   a plurality of storage media drive units in ones of said storage frames, said storage media drive units providing access to data stored on said removable storage media;
   a plurality of fiducial marks distributed at known locations in said plurality of storage frames;
   at least one accessor movably disposed on said horizontal rail and selectively moving ones said removable storage media between said storage storage racks and a selected one of said one or more drive units;
   a teach sensor on each said accessor, said each accessor aligning to said plurality of fiducial marks; and
   at least one library manger managing access to said storage media and controlling movement of a corresponding said at least one accessor, each said library manager locating said teach sensor at an expected fiducial mark location for a first search pass and at a second pass start position located horizontally towards a home location for said accessor and directly horizontal to said expected fiducial mark location.

15. A storage system as in claim 14, wherein at least one accessor and at least one library manager are a plurality of accessors and a plurality of library managers.

16. A storage system as in claim 14, wherein said plurality of fiducial marks are rectangular marks, a first group of said rectangular marks having a selected length and width and being horizontal fiducials having said length oriented horizontally and a second group of said rectangular marks being vertical fiducials having said length oriented vertically, said expected fiducial mark location being at an upper corner of said horizontal fiducials and at a midpoint of a side of said vertical fiducials.

17. A storage system as in claim 16, wherein said second pass start location is at least said width towards said home location.

18. A storage system as in claim 16, wherein said second pass start location is less than said length towards said home location from said expected fiducial mark location.

19. A storage system as in claim 16, wherein said horizontal fiducials locate said storage media drive units and said vertical fiducials locate said storage racks.

20. A storage system as in claim 16, said storage system further comprising:
   a convenience I/O station being located with said vertical fiducials.

21. A storage system as in claim 16, wherein said removable storage media is magnetic tape on tape cartridges.

* * * * *